United States Patent [19]

Tsenter

[11] Patent Number: 5,254,414
[45] Date of Patent: Oct. 19, 1993

[54] METAL AIR STORAGE BATTERY

[75] Inventor: Boris Tsenter, Jerusalem, Israel

[73] Assignee: Battery Technologies International, Jerusalem, Israel

[21] Appl. No.: 787,333

[22] Filed: Nov. 4, 1992

[51] Int. Cl.$^5$ .................... H01M 8/06; H01M 12/06
[52] U.S. Cl. .................................. 429/29; 429/49
[58] Field of Search ................. 429/27, 29, 49

[56] References Cited

U.S. PATENT DOCUMENTS

| | | | |
|---|---|---|---|
| 3,669,744 | 6/1972 | Tsenter et al. | 429/101 |
| 4,448,858 | 5/1984 | Graf et al. | 429/27 X |
| 4,560,626 | 12/1985 | Joy | 429/27 |
| 4,617,242 | 10/1986 | Dopp | 429/27 |
| 4,745,038 | 5/1988 | Brown | 429/27 |
| 4,828,939 | 5/1989 | Turley et al. | 429/27 X |

*Primary Examiner*—Stephen Kalafut
*Attorney, Agent, or Firm*—Mark M. Friedman

[57] ABSTRACT

A method of charging a metal-air or metal-oxygen electrochemical cell which serves to extend the useful life of the cell. Charging of the cell takes place with the addition of hydrogen to the air or oxygen cell which prevents the formation of oxygen and reduces the deterioration of the electrodes caused by oxidation. The conventional metal-air or metal-oxygen cell which is capable of injecting air or oxygen to the gas electrode during cell discharge is slightly modified to give it the ability to also inject hydrogen to the gas electrode during charging.

6 Claims, 2 Drawing Sheets

METAL AIR STORAGE BATTERY

BACKGROUND OF THE INVENTION

1. Field of the Invention

The present invention relates to metal-air or metal-oxygen electrochemical cells and to a method of operating such cells as a storage battery and, more particularly, to metal-air or metal-oxygen electrochemical cells and to a method of charging such cells so as to improve the cell performance.

2. Description of the Prior Art

Metal-air or metal-oxygen electrochemical cells require for their operation the consumption of oxygen at the positive electrode during cell discharge. In what follows the term metal-oxygen will be used generally to also include metal-air.

A typical metal-oxygen cell includes a vessel which contains an aqueous solution of an alkali or alkaline earth base, preferably KOH. Immersed in the electrolyte is a pair of electrodes. The negative electrode may be made of various metals, including, but not limited to zinc, cadmium and iron while the positive electrode may be made of any convenient material. In normal operation, when the cell is being discharged, anions, typically hydroxyl ions, travel to the negative electrode and react there with the metal, typically Fe, Zn or Cd, to yield electrons. At the positive electrode, injected oxygen reacts with the water of the electrolyte to form the anions.

For example, where an iron electrode is used as the negative electrode and where a base, such as KOH, is used as the electrolyte, electrochemical processes during cell discharge at the two electrodes can be described by the following reactions. The reaction at the negative electrode during discharge is:

$$Fe + 2OH^- \rightarrow Fe(OH)_2 + 2e^- \tag{1}$$

The reaction at the positive electrode during discharge is:

$$2e^- + \tfrac{1}{2}O_2 + H_2O \rightarrow 2OH^- \tag{2}$$

The summary reaction, combining reactions (1) and (2) is:

$$Fe + \tfrac{1}{2}O_2 + H_2O \rightarrow Fe(OH)_2 \tag{3}$$

It is seen that in order to make reaction (2) take place it is necessary to provide oxygen to the positive electrode. Oxygen is usually provided either as pure oxygen or in an impure form, most commonly as air.

Once such a cell is sufficiently discharged, it becomes necessary to recharge the cell before it can do any more work. Charging is accomplished by superimposing on the electrodes an external voltage of a sufficiently large oppositely directed electric potential so as to force the above reactions, (1) and (2), and therefore also (3), to take place in the reverse direction. It can be seen that oxygen is evolved in the course of carrying out reaction (2) in the opposite direction during charging.

The method of operation of the cell described above suffers from a number of basic disadvantages. First, the evolution of oxygen during the charging of the cell leads to the deterioration of the positive, or oxygen, electrode, including the loss of catalytic properties of the electrode, which loss permanently decreases the maximum current which the cell may produce during subsequent discharge. Oxygen evolution also indirectly harms the metal electrode because of the heat dissipation and consequent temperature increase in the cell which occurs in the charging process as a result of the parasitic reactions wherein the metal electrode reacts with oxygen and water to ionize to form the metal hydroxide, which reaction is highly exothermic.

Second, when air rather than pure oxygen is used in the discharge process, $CO_2$ contained in the injected air is absorbed in the electrolyte solution and is subsequently consumed, causing the KOH concentration in the electrolyte to decrease. The reaction is:

$$CO_2 + 2KOH \rightarrow K_2CO_3 + H_2O \tag{4}$$

While this is unavoidable under either the presently known processes or under the present invention, the importance of this reaction during charging is eliminated according to the process of the present invention. Conventional charging leads to the release of oxygen which bubbles to the surface and agitates the surface of the electrolyte solution thereby causing the absorption of air, containing some carbon dioxide, into solution. According to the present charging scheme, there is no evolution of gases and thus less opportunity for air, and carbon dioxide, to get entrained into the solution.

For these and other reasons which will be elaborated upon below, it is thus undesirable to charge a metal-oxygen cell in the conventional method. Several partial solutions have been proposed in an attempt to overcome some of these problems.

One approach has been to provide a third electrode which will be used exclusively for charging the cell. In this manner the main electrode is used only for discharge. Once the cell has been sufficiently depleted, the main electrode is disconnected and a third electrode is hooked up to the voltage source. Charging is accomplished through this third electrode which can be constructed so that it does not deteriorate from exposure to evolved oxygen during charging operations. Since the main negative electrode is not involved during charging, its deterioration is significantly slowed and it enjoys a longer life.

Another partial solution involves the fabrication of a complex and costly positive electrode which has pore structures designed such that oxygen can easily be pushed out to the electrolyte during cell discharge but that oxygen produced during charging is unable to reenter the electrode or penetrate to any great extent into the electrode and is therefore forced to travel along the electrode surface, thus adversely affecting only a small part of the electrode.

Both of the above solutions suffer from significant disadvantages. Both introduce additional costs in terms of capital and operating costs.

There is thus a widely recognized need for a simple and cost-effective method of charging metal-oxygen electrochemical cells which will not require the use of special or additional electrodes and which will still significantly increase the life of the cell electrode. It would be desirable to have a method of charging a metal-oxygen cell which would not expose the electrodes to oxygen.

SUMMARY OF THE INVENTION

In accordance with the present invention there is provided a method of charging a metal-oxygen electrochemical cell having a metal electrode and an oxygen electrode in an alkali metal hydroxide electrolyte, which comprises imposing a voltage across the electrodes, and providing hydrogen to the oxygen electrode.

The metal electrode may be made up of a metal, such as, but not limited to Fe, Zn or Cd. The electrolyte used may be potassium alkaline or salt electrolyte. Potassium hydroxide is used where the metal electrode is Fe, Zn or Cd, since it provides the highest reactions rates for the oxygen/hydrogen electrolyte, considerably faster rates than those achievable with NaOH. Effective concentrations of KOH can range from 2 to 11.5N. The cell may be supplied during discharge with either pure oxygen or with a gas containing oxygen, such as air.

The present invention successfully addresses the shortcomings of the presently known systems by eliminating the problems which are caused by the release of oxygen at the oxygen electrode during charging of the cell. This is accomplished by using a different charging method than has heretofore been known.

It is common to charge an electrochemical cell using the reverse of the discharge reaction. For example, to recharge the cell described in equations (1)-(3) one need simply impose a sufficiently large voltage differential across the two electrodes so as to force the reactions to proceed in the opposite direction. The effect is to redeposit the metal on the metal electrode. Such an approach is, however, accompanied by an undesirable effect, namely, the release of oxygen at the oxygen electrode.

According to the present invention a metal-oxygen cell is charged not by reversing the reactions shown in equations (1)-(3) but rather by forcing a different reaction to take place at the oxygen electrode, which reaction does not involve the release of oxygen. Instead of simply imposing a voltage differential on the electrodes, one must, in addition, also supply hydrogen to the oxygen electrode. The presence of the hydrogen prevents the formation of oxygen.

The present invention thus discloses a novel method of charging a metal-oxygen electrochemical cell which does not involve the release of oxygen at the oxygen electrode. The absence of oxygen prevents the deterioration of the oxygen electrode and significantly lengthens the life of both the air and the metal electrodes. In addition, a significantly lower imposed voltage, and thus, lower power, is required during charging. Of course, the energy saved will ordinarily be used to generate the hydrogen used for charging. However, since the hydrogen generation would normally take place at times other than during charging, it is possible to "peak shave" the demand for power by carrying out the hydrogen generation during times when relatively inexpensive electrical power is available and not when power is being used to charge the system. The splitting of the energy requirements of the system into two (hydrogen production and charging) makes it possible to more efficiently utilize existing power generating facilities and lower the cost of operations. Furthermore, the amount of energy released during charging is significantly reduced, thereby reducing the evaporation of water from the cell. Other advantages will be seen from the detailed description below.

BRIEF DESCRIPTION OF THE DRAWINGS

The above and other embodiments of the present invention may be more fully understood from the following detailed description when taken together with the accompanying drawings in which.

DESCRIPTION OF THE PREFERRED EMBODIMENTS

The present invention is of a method of charging a metal-oxygen electrochemical cell which can be used with presently known metal-oxygen electrochemical cells upon slight modification. Specifically, the present invention calls for the introduction of hydrogen to the oxygen electrode during charging to prevent the formation of oxygen and to provide additional advantages to be discussed below.

Figure 1:
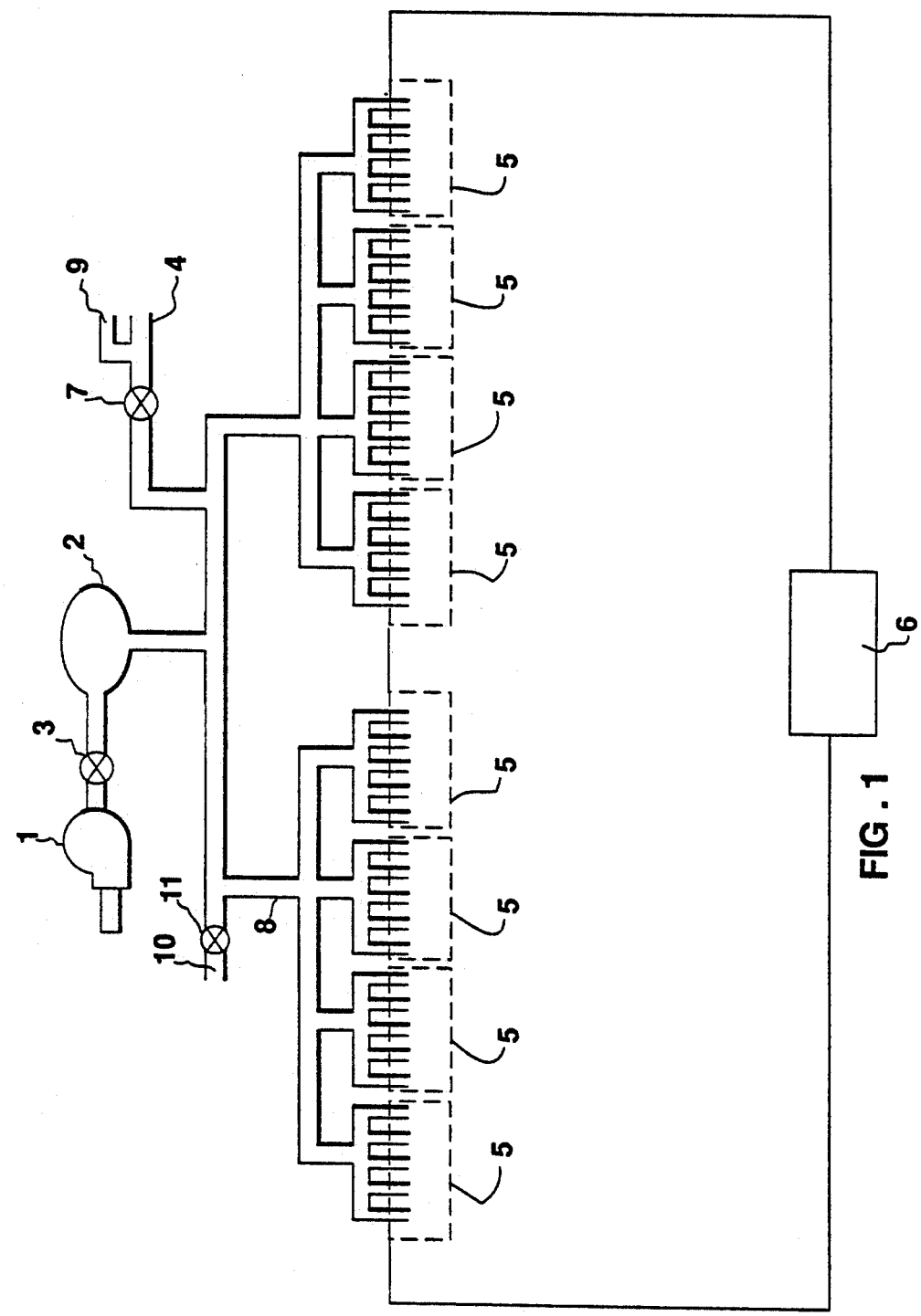
FIG. 1 is a schematic depiction of a metal-oxygen electrochemical cell system with provisions for the supply of hydrogen according to the present invention.

Referring now to the drawing, FIG. 1 shows a metal-oxygen electrochemical battery system according to the present invention, which includes a number of cells connected electrically to each other and provided with equipment for feeding and removing the various gases involved. For purposes of describing the present invention the term "cell" shall be used to include one or more cells connected electrically and provided with the equipment which allows the system to work as described herein. The system comprises an oxygen or air pump 1, an air alkaline filter 2 for removing most of the carbon dioxide in the air, an oxygen or air inlet valve 3, a hydrogen inlet line 4, a hydrogen inlet valve 7, and metal-oxygen cells 5. Each cell 5 is connected with its neighboring cells either in series or in parallel as desired. The system also features a common gas supply manifold 8.

In principle, it may be necessary to include also a hydrogen pump, or to provide piping and valves to make possible the use of the existing air/oxygen the pump for the pumping of the hydrogen. The hydrogen pump is omitted from the drawing since, depending on the source of the hydrogen, it may already be available at sufficiently high pressures to be moved into the cells. By contrast, it is highly probable that an air pump is necessary since relatively high pressures, above those necessary for simple transportation of the air, will be needed to move air into the cells. This is because the nitrogen, which forms approximately 79% of the air, tends to form nitrogen pockets near the electrodes which will tend to prevent the introduction of oxygen into the electrodes unless sufficiently high pressures are used to push the air to the electrodes.

It may be highly desirable to purge the system with nitrogen gas both before and after the charging phase in order to minimize the contact between the hydrogen and the oxygen and thus eliminate or greatly reduce the chance for an explosion. A nitrogen inlet line 9 is shown in FIG. 1. For convenience, nitrogen inlet line 9 may be connected to hydrogen inlet line 4. Venting of gases to the atmosphere can take place through a vent line 10 which is controlled by a vent valve 11.

Depending on whether the cell is being charged or discharged, the system also features a source of current or a load 6, respectively. Metal-oxygen cells 5 can be of any convenient design. Typically, each metal-oxygen cell 5 consists of sets of alternating metal and oxygen electrodes, each pair of electrodes is separated from its neighbor by a separator (not shown). An alkaline metal base solution, such as KOH, is used as the electrolyte.

The oxygen electrode operates in two distinct modes. During discharge, the oxygen electrode receives and consumes oxygen from outside. During charging the oxygen electrode receives and consumes hydrogen from outside.

Figure 2:
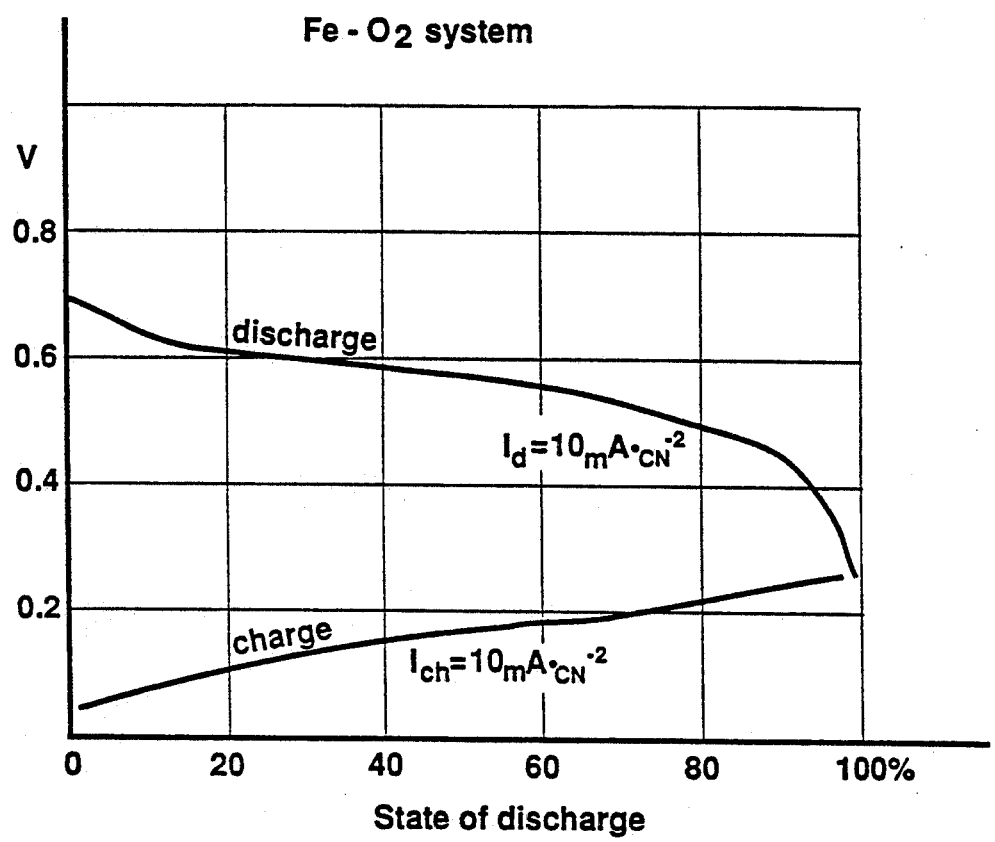
FIG. 2 is a plot of the metal-oxygen system voltage as a function of the degree of charging.

FIG. 2 shows typical charge-discharge curves of an iron-oxygen cell operated according to the present invention. It is noteworthy that, because of the different electrochemical properties of the hydrogen charging reaction compared to the normal charging reaction, the imposed voltage during charging is significantly lower than would be the case in the absence of the hydrogen. The imposed voltage may, in fact, be lower than the discharge voltage of the cell.

According to the present invention, hydrogen is introduced to the oxygen electrode during charging. The electromotive force of each cell during charging with hydrogen is on the order of 0.05 V.

Charging of the iron electrode and oxidation of hydrogen on the oxygen electrode takes place through the application of a voltage potential to the electrodes in the presence of hydrogen. The reaction during charging at the oxygen electrode is:

$$H_2 + 2OH^- \rightarrow 2e + 2H_2O \quad (5)$$

The reaction during charging at the metal electrode is:

$$Fe(OH)_2 + 2e \rightarrow Fe + 2OH^- \quad (6)$$

The summary reaction during charging according to the present invention is:

$$Fe(OH)_2 + H_2 \rightarrow Fe + 2H_2O \quad (7)$$

This process proceeds with a voltage approximately 0.05 to 0.40 V. The normal potential of Fe in alkaline electrolyte is 0.877 V, while the normal potential of $H_2$ in the same solution is 0.828 V. This gives an electromotive force for the combined cell of approximately 0.05 V during hydrogen charging.

As an added benefit, hydrogen evolving from the iron electrode in an undesirable side reaction is beneficially consumed by the reaction occurring at the oxygen electrode thereby lowering the hydrogen demand of the charging operation. Using conventional charging techniques, hydrogen evolving at the metallic electrode leaves the cell. Using the methods of the present invention, the charging reaction at the Fe electrode can be described as:

$$2H_2O + 2e^- \rightarrow H_2 + 2OH^- \quad (8)$$

This reaction transfers hydrogen to the air electrode where the hydrogen undergoes the reverse reaction. This is known as a "closed hydrogen cycle" and is described in Tsenter U.S. Pat. No. 3,669,744, which is incorporated herein by reference in its entirety.

In addition, because of the low voltage under which the charging process takes place, as explained above, the hydrogen-forming reaction at the metal electrode does not consume a large amount of energy and is therefore less significant than it would have been otherwise.

When the metal electrodes of each cell 5 have been fully charged, the input of hydrogen is interrupted and gas manifold 8 is isolated from the atmosphere by hydrogen valve 4 and oxygen valve 3. One benefit is that, unlike certain currently known systems which feature a second electrode for charging purposes, the cells according to the present invention may be charged while connected in parallel and not just while connected in series or individually.

Once the cells are fully charged the battery is ready to begin discharging, providing useful work. At the completion of the charging the superimposed voltage is removed and in its place electrical load 6 is connected.

The use of hydrogen in the charging of the oxygen electrode prevents the evolution of oxygen and thus prevents the oxidation of the metal electrode and at the same time leads to the preservation of the catalytic properties of the oxygen electrode.

An added benefit accruing from the use of hydrogen during the charging of the metal electrode is that, unlike the charging process in the absence of hydrogen, the electrochemical charging reaction according to the present invention produces more water than is consumed by the electrochemical discharging process. The extra production of water tends to at least partially compensate for the water evaporated during operation because every cycle of charge-discharge produces a net increase in water in the electrolyte, with the charging operation producing twice as much water as is consumed in the discharging operation. The reaction at the oxygen electrode during charging is given by equation (5). Equation (2) gives the reaction at the oxygen electrode upon discharge. The sum of the two reactions is given by the equation $$\tfrac{1}{2}O_2 + H_2 \rightarrow H_2O \quad (9)$$

which clearly shows the net production of water.

The evaporation of water into the exiting air stream is controlled by keeping the temperature of the solution as low as possible, thereby lowering the partial pressure of water. This can be seen with reference to the reactions described in the equations above.

Furthermore, charging the cells according to the present invention leads to reduced consumption of $CO_2$. This is because during charging the electrolyte has no contact with the atmosphere. The only contact with the atmosphere is during discharge when air is input into the oxygen electrode.

The metal electrode may be of any convenient material. Many different metals may be used. Preferably the metal electrode is made of iron, zinc or cadmium. Iron electrodes are particularly useful where the cell does not need long shelf life properties and it is not essential to have highly favorable self-discharge properties. Cadmium electrodes are particularly useful where the cell needs long shelf life qualities since cadmium electrodes tend to hold their charge and to be largely immune to self-discharge. Zinc electrodes are useful where there is a need for high energy density, although they are more costly than iron electrodes.

The oxygen electrode preferably incudes catalytic materials to promote the electrochemical reactions. As catalyst one can use Pt for promoting both the hydrogen and the oxygen functions. One could further include carbon, silver and/or spinels to catalyze the oxygen function.

The oxygen electrode will be of carbon bound to a hydrophobic component, such as polytetrafluoroethylene—PTFE, with a catalyst, such as silver.

Electrolytes which can be used include any suitable electrolyte, preferably KOH where iron, zinc, or cadmium is used for the metal electrode.

For illustrative purposes only, without in any way limiting the scope of the present invention, a particular metal-oxygen cell which can be operated according to the present invention is described in more detail. The metal electrode is made of iron. The iron electrode has a thickness of 1.2 mm and is sintered. The electrode is made by pressing deep reducing iron powder on iron ribbon. The temperature of the reduction process in an atmosphere of $H_2$ is 700°–850° C.

The oxygen electrode is a double-layered air electrode. The internal layer, of thickness 0.3 mm, is composed of a mixture of 50% polytetrafluoroethylene (PTFE) and 50% carbon. The external layer is immediately adjacent to the first layer and surrounds it on all sides. The external layer is 1.6 mm thick and is composed of a mixture of 75% carbon, 5% acetylene soot, 15% PTFE and 0.1% Pt.

The function of the PTFE is two-fold. It is simultaneously a binding component and a hydrophobic element. The carbon is primarily structural, but also serves as a catalyst and as an electrical conductor. The acetylene soot is added to improve the electrical conductivity. Platinum serves as a catalyst for both the charging and the discharging processes.

The thickness of the internal diffusion layer should be as thin as possible, limited only by available manufacturing techniques. The thickness of the external layer is determined mainly by the distance of penetration of the electrochemical process in the porous electrode. As separator one can use non-woven polypropylene. FIG. 2 shows charge-discharge curves of this cell.

It is seen that the present invention and the embodiments disclosed herein are well adapted to obtain the ends set forth at the outset. Certain changes can be made in the method without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to obtain the ends and advantages mentioned, as well as others inherent therein.

Those skilled in the art may find may variations and adaptations thereof, and all such variations and adaptations, falling within the true scope and spirit of applicant's invention, are intended to be covered thereby.

What is claimed is:

1. A metal-oxygen electrochemical cell, comprising:
   (a) a vessel;
   (b) an alkali metal hydroxide electrolyte partially filling said vessel;
   (c) a metal electrode immersed in said electrolyte; an oxygen electrode immersed in said electrolyte;
   (d) means for introducing oxygen to said oxygen electrode;
   (e) means for introducing hydrogen to said oxygen electrode;
   (f) means for cutting off said oxygen to said oxygen electrode; and
   (g) means for cutting off said hydrogen to said oxygen electrode.

2. A cell as in claim 1 wherein said metal is selected from the group consisting of iron, zinc and cadmium.

3. A cell as in claim 2 wherein said metal is iron.

4. A cell as in claim 1 wherein said electrolyte is potassium hydroxide.

5. A cell as in claim 1 wherein said metal-oxygen electrochemical cell receives oxygen in a mixture with other gases.

6. A cell as in claim 5 wherein said metal-oxygen electrochemical cell receives oxygen in the form of air.

* * * * *